United States Patent [19]

Kuroda

[11] Patent Number: 5,648,197
[45] Date of Patent: Jul. 15, 1997

[54] OPTICAL DISK

[75] Inventor: Mikiya Kuroda, Yokohama, Japan

[73] Assignee: Victor Company of Japan, LTD., Yokohama, Japan

[21] Appl. No.: 594,179

[22] Filed: Jan. 31, 1996

[30] Foreign Application Priority Data

Jan. 31, 1995 [JP] Japan ................................ 7-034399

[51] Int. Cl.$^6$ ........................................................ G11B 7/24
[52] U.S. Cl. .................. 430/270.11; 430/945; 428/64.4; 428/64.8
[58] Field of Search ............................... 430/270.11, 945; 428/64.4, 64.8

[56] References Cited

U.S. PATENT DOCUMENTS 5,190,800  3/1993  Yamada et al. ........................ 430/945
5,281,512  1/1994  Kobayashi et al. ................. 430/270.17

Primary Examiner—John A. McPherson
Attorney, Agent, or Firm—Jacobson, Price, Holman & Stern, PLLC

[57] ABSTRACT

An optical disk is provided for recording data thereon as optically readable pits formed thereon and for reading data from the pits by means of a reproducing laser beam. The disk has a substrate of a light transmissive material. A reflective layer of a light reflective material is formed on one of the surfaces of the substrate. A light absorbing layer is formed on the other surface of the substrate on which the reproducing laser beam is projected. The light absorbing layer containing a coloring substance exhibiting light absorption characteristics that is small for the reproducing laser beam but large for a laser beam of a specific light wavelength band shifted from the reproducing laser beam wavelength band to a longer light wavelength side. The substrate may be of a colored substrate including the coloring substance. The light absorbing layer is not required in this case.

3 Claims, 2 Drawing Sheets

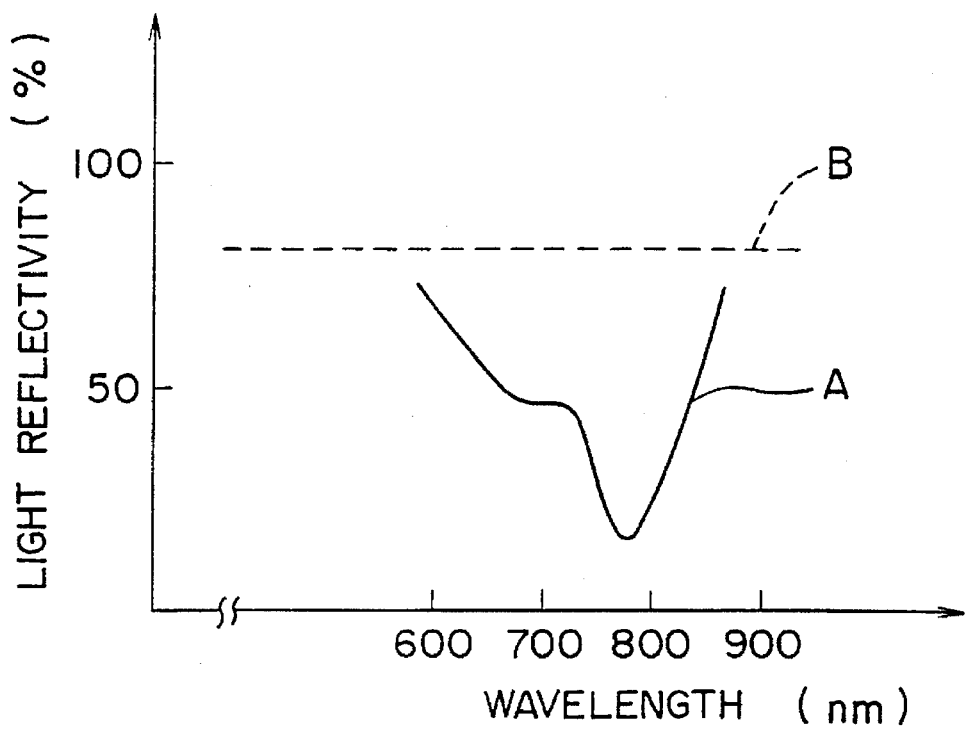
F I G. 3
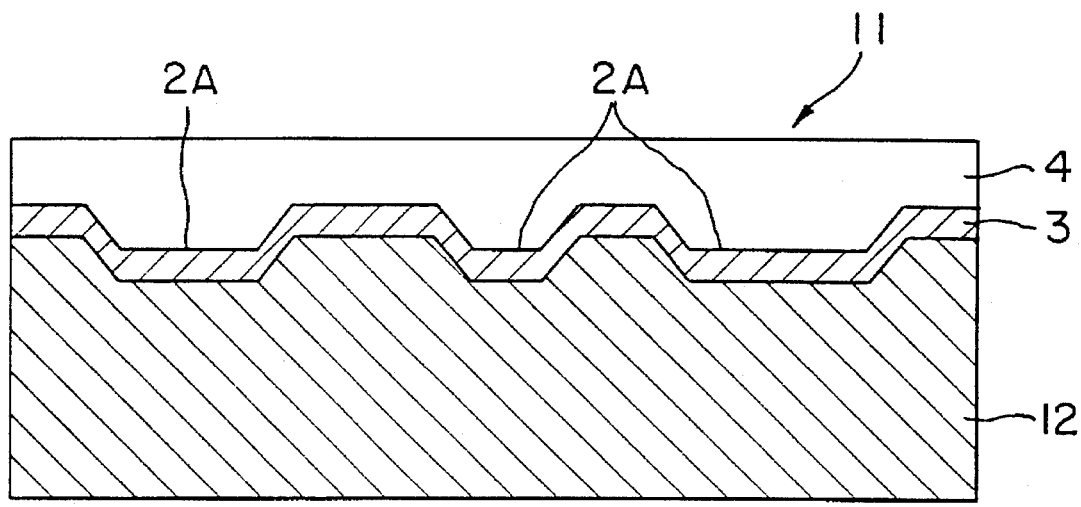
F I G. 4

OPTICAL DISK

BACKGROUND OF THE INVENTION

1. Field of the Invention

The present invention relates to an optical disk on which data is recorded in a high density manner. More specifically, this invention relates to a high density optical disk on which pits smaller than those of a conventional compact disk (referred to as a CD, simply) can be recorded and further data can be recorded and/or reproduced by a laser beam having a wavelength band shorter than the wavelength band (near infrared ray band) of a laser beam source used for a conventional CD player.

2. Description of the Prior Art

Recently, there has been studied a method of increasing the recording density of the optical disk by use of a laser beam source having wavelengths shorter than those of the near infrared ray band (770 nm to 830 nm) so far used in practice for a so-called compact disk system (referred to as CD system, hereinafter). This is because a practical use of a system using a semiconductor laser beam having wavelengths on the order of 600 nm or a laser beam using SHG (Second Harmonic Generation) having wavelengths on the order of 400 to 500 nm, for instance has become close at hand. When the wavelengths of the reproducing laser beam are shortened as described above, since the diameter of the spots of the reproducing laser beam can be reduced, it has become possible to shorten the shortest pit length and further to narrow the track pitch in comparison with the conventional CD. It has also become possible to increase the recording density per unit area, and thereby, a quantity of data larger than that of the conventional CD can be recorded in an optical disk whose diameter is the same as that of the conventional CD (e.g., CD of 12 cm in diameter).

However, it is impossible to reproduce data recorded on the above-mentioned high density recording type optical disk (referred to as high density optical disk, hereinafter) on which pits are recorded in a high density in correspondence to the laser beam of shorter wavelength band, when the conventional CD player is used. When the high density optical disk is mounted on the conventional CD player erroneously, it has been confirmed that the following problems arise:

When a conventional optical disk (CD) is mounted on the conventional CD player, the conventional CD player generally executes an automatic initial operation in accordance with the following sequence:

| (1) | focus servo | ON |
| (2) | focus lock | OK |
| (3) | turntable | ON |
| (4) | tracking servo | ON |

In other words, whenever the high density optical disk is mounted on the conventional CD player of the above-mentioned sequential operation, the conventional CD player executes the above-mentioned initial operation.

Here, in the case where the light reflection factor (reflectivity) of the mounted high density disk is of the same extent of that of the CD, there arises no problem until the mode of Item (2) above.

With respect to the turntable ON of Item (3) above, there are certain methods designed into the CD players. For instance, there exists such a typical method wherein a T.T. (turntable) motor is set to a first control mode and the turntable is rotated in a speed control mode wherein the maximum frequency 3T of the reproduced signals is set to the vicinity of a value (i.e., 696 ns) prescribed for the CD. In this method, however, when the mounted disk is of high density type, since the conventional CD player cannot read pits recorded on the mounted high density optical disk, the speed control mode will not function.

Further, a time difference is provided between the mode of Item (3) and the mode of Item (4) according to the design of the CD player. For instance, there are CD players that provide a time difference of about 1 to 3 sec between the modes of Items (3) and (4).

Further, with respect to the mode of Item (4), when a linear speed is low, since the frequency components of the reproduced signals are relatively low and thereby the tracking detection signal is obstructed by the reproduced signals, it is necessary to set the linear speed of the optical disk to such a prescribed value that the tracking servo can be stabilized. In this case, however, when the speed control mode does not function as described above, the disk rotates at a speed higher than 600 r.p.m. Where an unbalance force generated by the optical disk rotating at a relatively high speed exceeds a clamping force, there arise various problems such as vibration, contact between the disk and the player, scratches of the disk and the player, etc.

Further, there exist some players in which the function of detecting the disk rotation stop is not sufficient. In the case of such players, some tests have confirmed that a tray is shifted outside as in an unload mode in spite of the fact that the disk is rotating at a high speed (i.e., not yet stopped). In this case, the disk and the player are both scratched.

SUMMARY OF THE INVENTION

With these problems in mind, therefore, it is the object of the present invention to provide a high density optical disk of such structure that a conventional CD player will not operate erroneously, even if the high density optical disk is mounted on the conventional CD player erroneously.

To achieve the above-mentioned object, the present invention provides an optical disk for recording data thereon as optically readable pits formed thereon and for reading data from the pits by means of a reproducing laser beam, the optical disk comprising: a substrate formed of a light transmissive material; a reflective layer formed of a light reflective material and formed on one of the surfaces of the substrate; and a light absorbing layer formed on the other surface of the substrate on which the reproducing laser beam is projected, the light absorbing layer containing a coloring substance exhibiting light absorption characteristics that are small for the reproducing laser beam but large for a laser beam of a specific light wavelength band shifted from the reproducing laser beam wavelength band to a longer light wavelength side.

Further, the present invention provides an optical disk for recording data thereon as optically readable pits formed thereon and for reading data from the pits by means of a reproducing laser beam, the optical disk comprising: a colored substrate formed of a light transmissive material, a coloring substance being dispersed in the colored substrate, the coloring substance exhibiting light absorption characteristics that are small for the reproducing laser beam but large for a laser beam of a specific light wavelength band shifted from the reproducing laser beam wavelength band to a longer light wavelength side; and a reflective layer formed of a light reflective material and formed on the colored substrate.

Further, the present invention provides an optical disk for recording data thereon and for reading data by means of a reproducing laser beam, the optical disk comprising: a substrate; and means for absorbing a light beam projected on the optical disk, the light absorbing means exhibiting light absorption characteristics that are small for the reproducing laser beam but large for a laser beam of a specific light wavelength band shifted from the reproducing laser beam wavelength band to a longer light wavelength side.

The light absorbing means may include a light absorbing layer having a coloring substance exhibiting light absorption characteristics that are small for the reproducing laser beam but large for a laser beam of a specific light wavelength band shifted from the reproducing laser beam wavelength band to a longer light wavelength side.

Further, the light absorbing means may include a colored substrate having a coloring substance exhibiting light absorption characteristics that are small for the reproducing laser beam but large for a laser beam of a specific light wavelength band shifted from the reproducing laser beam wavelength band to a longer light wavelength side.

It is preferable that the specific light wavelength band is near infrared ray wavelength band, and the light absorbing layer is constructed in such a way that light reflection factor of the optical disk irradiated with a laser beam of near infrared ray wavelength band is 40% or less.

It is preferable that the specific light wavelength band is near infrared ray wavelength band, and the colored substrate is constructed in such a way that light reflection factor of the optical disk irradiated with a laser beam of near infrared ray wavelength band is determined to be 40% or less.

In the optical disks described above, the coloring substrate may be selected from the group consisting of diphenyl methane, triphenyl methane, polymethylene, porphin, indanthrene, quinone, dithiol, and aluminum-dimonum.

BRIEF DESCRIPTION OF THE DRAWINGS

FIG. 3 is a graphical representation showing the light reflection characteristics of the high density optical disk according to the present invention; and FIG. 4 is a cross-sectional view showing a second embodiment of the high density optical disk according to the present invention.

DETAILED DESCRIPTION OF THE EMBODIMENTS

A first embodiment of the high density optical disk according to the present invention will be described hereinbelow with reference to the attached drawings.

The optical disk according to the present invention is provided with light absorbing means having a coloring substance of such characteristics that the light absorption rate is large for the near infrared ray band as the reproduced light wavelength band of the conventional CD but small for the reproduced light wavelength band (shorter than that of the conventional CD) of the high density optical disk of the invention.

Figure 1:
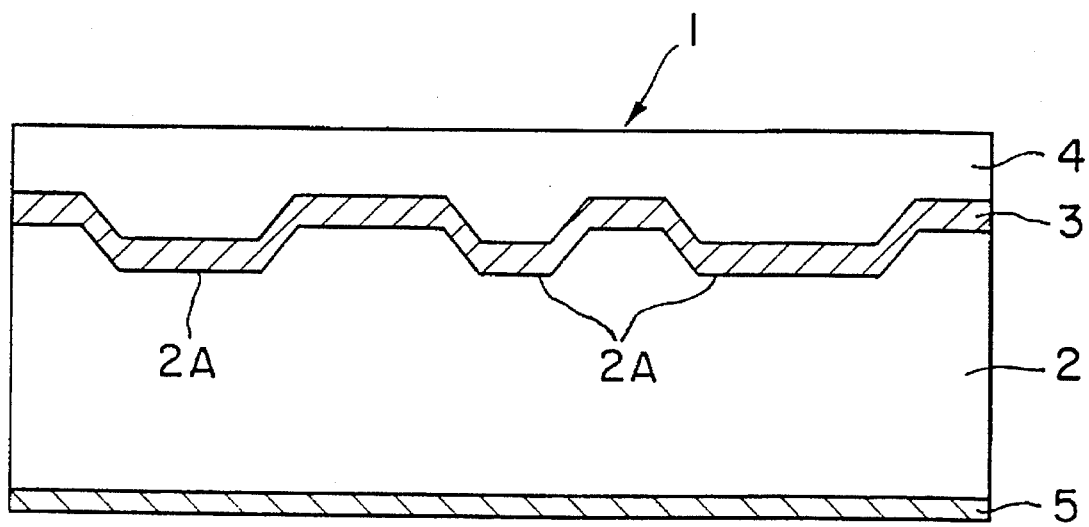
FIG. 1 is a cross-sectional view showing a first embodiment of the high density optical disk according to the present invention.

FIG. 1 shows a cross-sectional structure of the first embodiment of the high density optical disk according to the present invention, taken along the track direction.

In the drawing, an optical disk 1 is constructed by laminating a reflective layer 3 and a protective film 4 in sequence on a light transmissive substrate 2. The reflective layer 3 is formed of a light reflective material. The protective film 4 is formed of an UV hardened resin. Further, optically readable pits 2A are formed on a surface of the light transmissive substrate 2. In addition, on the other surface of the substrate 2, a light absorbing layer 5 is formed to absorb light in a specific light wavelength band shifted from the light wavelength band of a reproducing laser beam for the high density optical disk 1 to the longer light wavelength side.

As the above-mentioned substrate 2, it is possible to use light transmissive resin used for the conventional optical disk substrate (e.g., polycarbonate, polyester methacrylate, epoxy resin, etc.) or glass, etc.

The shortest pit length of the pits 2A recorded on the substrate 2 is shorter than that of pits recorded on the conventional CD. And, the track pitch of the pits 2A is also narrower than that of the pits recorded on the conventional CD. These pits 2A are recorded in accordance with the well known method. Therefore, it is impossible to read the pits 2A recorded on the high density optical disk 1 by use of the laser beam of near infrared ray band used for the conventional CD layer.

As the light reflective layer 3, one of metals such as Au, Ag, Cu, Al, In, Pt, Cr, Ni, etc. or an alloy of these metals can be used.

The protective layer 4 is formed by spin coating an ultraviolet ray hardened resin to protect the surface of the optical disk 1 and to prevent the reflective layer 3 from corrosion.

Figure 2:
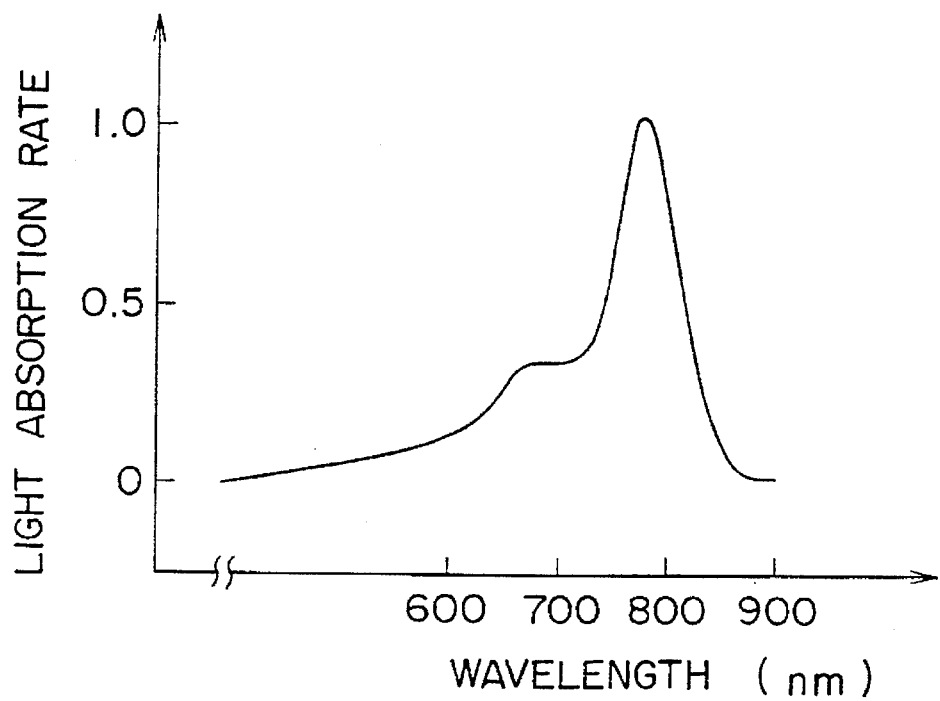
FIG. 2 is a graphical representation showing the spectrometry characteristics of a coloring substance.

Further, the light absorbing layer 5 is formed by using a coloring substance as the main component. The coloring substance is of such characteristics that the light absorption rate is small for the reproduced light wavelength band of the high density optical disk 1 but large for the near infrared ray band (770 to 830 nm) shifted from the reproduced light wavelength band to the longer light wavelength side. In other words, the coloring substance is provided with such spectrometry characteristics that the light absorption rate is large for the near infrared rays and further the light absorption rate is maximized at a light wavelength of about 780 nm, as shown in FIG. 2. That is, since the light wavelength band of the laser beam source used for the conventional CD player is the near infrared rays, the laser beam emitted from a laser beam source of the conventional CD player is largely absorbed by the light absorbing layer 5 of the high density optical disk 1.

As a result, the light reflectivity characteristics of the high density optical disk 1 is such that the light reflectivity is low (less than 40%) in the near infrared ray band (770 nm to 830 nm) used for the conventional CD layer but high in the reproduced light wavelength band shifted form the near infrared ray band to the shorter light wavelength side, as shown by a solid line A in FIG. 3. In FIG. 3, a dot line B denotes the light reflectivity characteristics of the conventional CD (an optical disk formed with no light absorbable layer) which is roughly constant irrespective of the light wavelengths of the laser beam.

The light absorbing layer 5 is formed in such a way that first a predetermined amount of coloring substance having the above-mentioned spectrometry characteristics is mixed with a photo-polymer to form film; and the film is hardened by irradiating UV (ultra violet rays) thereupon. In this process, when the photo-polymer is selected appropriately, it is possible to obtain the function as the protective coat at the same time. As the coloring substance, any substances can be used as far as the above-mentioned spectrometry characteristics can be satisfied. That is, any coloring substance which can absorb near infrared rays can be used, for instance such as diphenyl methane, triphenyl methane, polymethylene, porphin, indanthrene, quinone, dithiol, aluminum-dimonum, etc. When considering the reliability against temperature and humidity, porphin, indanthrene, and quinone are preferable. In particular, since the light absorption coefficient of phtalocyanine or naphthalocyanine of porphine is relatively large, it is preferable to use these substances because the required characteristics can be obtained by adding a small amount thereof to the photo-polymer.

The light absorbing layer 5 is formed by adding the coloring substance to the photo-polymer in such a way that the light reflectivity of the optical disk 1 for the laser beam of near infrared ray band can be 40% or less. Further, in order to improve the reproduced signal quality, the optical disk 1 is constructed in such a way that the attenuation rate of the reflected light quantity in the wavelength band of the reproduced laser beam lies from 0 to 0.5 (preferably 0 to 0.2).

A second embodiment of the high density optical disk provided with a colored substrate as the light absorbing means according to the present invention will be described hereinbelow with reference to FIG. 4.

FIG. 4 shows the cross-sectional structure of the second embodiment of the high density optical disk taken along the track direction, in which the same reference numerals have been retained for the similar elements having the same functions as with the case of the first embodiment without repeating the similar description thereof.

In an optical disk 11 shown in FIG. 4, a reflective layer 3 and a protective film 4 are laminated in sequence on a colored substrate 12. The colored substrate 12 can absorb specific light wavelength band shifted from the reproduced light wavelength band to the longer light wavelength side.

The colored substrate 12 is constructed by dispersing the afore-mentioned coloring substance into the light transmissive resin such as polycarbonate, polyester methacrylate, epoxy resin, etc. Therefore, the light reflectivity characteristics of the optical disk 11 are basically the same as those of the optical disk 1, as shown by the solid line A in FIG. 3.

After the coloring substance has been mixed with the light transmissive resin such as polycarbonate, polyester methacrylate, epoxy resin, etc., the optical disk 11 is formed in accordance with the conventional molding method such as injection molding or 2P (Photo Polymer) method. During the molding, where the conventional polycarbonate is used, since the molding temperature is very high, a heat resistance at 350° to 400° C. or higher is required for the coloring substance. Therefore, it is preferable to use the heat-resistant resin such as porphin, indanthrene, quinone, etc. as the coloring substance for the optical disk 11.

Further, in the same way as with the case of the optical disk 1, the optical disk 11 is constructed in such a way that the light reflectivity for the near infrared rays is 40% or less and further the attenuation rate of the reflected light quantity in the wavelength band of the reproduced laser beam lies from 0 to 0.5 (preferably 0 to 0.2).

Comparison will be made between sample disks for the first and second embodiments and conventional disks.

A high density optical disk was constructed by laminating an Al (aluminum) reflective layer 3 and a protective film 4 in sequence on a polycarbonate substrate 2 (the first embodiment) on which EFM signals are recorded in trains of minute pits in a density 3.5 times higher than that of the conventional compact disk (CD). Further, the coloring substance of naphthalocyanine having the spectrometry characteristics as shown in FIG. 2 was added by 1.0 wt % to a photo-polymer. After having been mixed uniformly, the photo-polymer mixed with the coloring substance was coated on the data read surface side of the substrate 2. Further, the formed film was irradiated with UV rays for hardening, so that an optical disk 1 formed with the light absorbable layer 5 having a film thickness of about several nm was formed. The light reflectivity characteristics of this formed optical disk 1 was substantially the same as those shown by the solid line A in FIG. 3.

The formed optical disk 1 was mounted on various CD players (having the laser beam wavelengths from 770 to 830 nm). In this case, since the quantity of light reflected from the disk is insufficient, the afore-mentioned focus lock is not set to OK, so that the turntable was not rotated. In other words, since the initial operation mode of Items (1) to (4) was not executed, an erroneous operation of the CD players did not occur. As a result, it is possible to previously prevent the erroneous operation of the conventional CD player when the high density optical disk is mounted thereon erroneously.

Further, when the formed high density optical disk was mounted on a high density optical disk drive, reproduced signals of sufficient quantity were obtained, so that the data was reproduced without causing any problems.

Next, a colored substrate 12 (the second embodiment) of the high density optical disk 11 was formed by adding coloring substance of naphthalocyanine by 0.01 wt % to a polycarbonate and by molding the polycarbonate. Further, EFM signals are recorded in trains of minute pits in a density 3.5 times higher than that of the conventional compact disk (CD). Further, on the colored substrate 12, an Al (aluminum) reflective layer 3 and a protective layer 4 were laminated in sequence to form the high density optical disk 11. The light reflectivity characteristics of this formed optical disk 11 were substantially the same as those shown by the solid line A in FIG. 3.

The formed optical disk 11 was mounted on various CD players (having the laser beam wavelengths from 770 to 830 nm). In this case, an erroneous operation of the CD players did not occur. Further, when the formed high density optical disk was mounted on a high density optical disk drive, reproduced signals of sufficient quantity were obtained.

For the comparison with the above sample disks (the first and second embodiments), an optical disk was formed by laminating an Al (aluminum) reflective layer 3 and a protective film 4 in sequence on a polycarbonate substrate 2 on which EFM signals were recorded in trains of minute pits in a density 3.5 times higher than that of the conventional compact disk (CD). The light reflectivity characteristics of this formed high density optical disk were the same as those shown by the dot line B in FIG. 3.

The formed high density optical disk was mounted on various CD players (having the laser beam source wavelengths from 770 to 830 nm). It was confirmed that in some CD players, the disk was rotated at a speed higher than 600 r.p.m. or a tray is moved outward in an unload mode in spite of the fact that the optical disk rotating at high speed was not yet completely stopped. In the conventional CD players and in the high density optical disk mounted on the same CD players, the contact portion between the optical disk and the player was scratched.

As understood on the basis of the above-mentioned sample disks, in the high density optical disk according to the present invention, the optical disk is formed with a light absorbing layer or a colored substrate constructed by using a coloring substance as the major component. The coloring substance is selected from the substances that exhibit a light absorption factor which is large for reproduced light wavelengths of the conventional CD player (a laser beam of near infrared light wavelength band) but small for the reproduced light wavelength band of the high density optical disk player (shifted from the near infrared light wavelength band to the shorter light wavelength side). In addition, the light reflection factor of the light absorbing layer or the colored substrate for the near infrared laser beam used for the conventional optical disk is less than 40%. Therefore, even when the high density optical disk is mounted erroneously on the conventional CD player, since the turntable will not rotate due to an insufficient quantity of light reflected from the high density optical disk, it is possible to prevent the conventional CD player from being operated erroneously. Further, the attenuation rate of the reproduced light wavelength band shifted from the near infrared light band to the shorter light wavelength side is determined to be 0 to 0.5 (preferably 0 to 0.2). It is thus possible to obtain sufficient reproduced signal quality in the reproduced light wavelength band of the laser beam for the high density optical disk.

Further, in the above-mentioned embodiments, the high density optical disk has been described as above provided with a light absorbing means having the light absorbing layer 5 or colored substrate 12 whose light absorbing wavelength ranges from 770 to 830 nm. However, the reproduced light wavelength band of the conventional CD is 780±10 nm. This means that most conventional CD players emit a laser beam of the wavelength band in the range of 780±10 nm. Therefore, in order to prevent the conventional CD player from being operated erroneously, the light absorbing layer 5 or colored substrate 12 may be formed such that the light reflection factor thereof is less than 40% at least against a light beam of the wavelength band in the range of 780±10 nm.

Further, in the above-mentioned embodiments, although the high density optical disk has been described only in the context of a reproduce-only type optical disk, it is of course possible to apply the present invention to recordable type optical disks such as an additional data writing type or a data rewritable type.

As described above, in the optical disk according to the present invention, it is possible to previously prevent the conventional reproducing apparatus having a laser beam source of light wavelengths longer than those of the reproducing laser beam for a high density optical disk, from being operated erroneously. In particular, in the case of the high density recording type optical disk on which pits smaller than those of the conventional CD are recorded, the light reflection factor of the high density optical disk for the near infrared light band (shifted to the longer light wavelength side from the reproducing light wavelengths of the high density optical disk) is 40% or less. It is thus possible to prevent the erroneous operation of the conventional CD player caused whenever the high density optical disk is mounted thereon erroneously.

What is claimed is:

1. An optical disk for recording data thereon as optically readable pits formed thereon and for reading data from the pits by means of a reproducing laser beam, the optical disk comprising:

a substrate formed of a light transmissive material;

a reflective layer formed of a light reflective material and formed on one of the surfaces of the substrate; and a light absorbing layer formed on the other surface of the substrate on which the reproducing laser beam is projected, the light absorbing layer containing a coloring substance exhibiting light absorption characteristics that are small for the reproducing laser beam but large for a laser beam of a specific light wavelength band shifted from the reproducing laser beam wavelength band to a longer light wavelength side.

2. The optical disk of claim 1, wherein the specific light wavelength band is near infrared ray wavelength band, and the light absorbing layer is constructed in such a way that light reflection factor of the optical disk irradiated with a laser beam of near infrared ray wavelength band is 40% or less.

3. The optical disk of claim 1, wherein the coloring substance is selected from the group consisting of diphenyl methane, triphenyl methane, polymethylene, porphin, indanthrene, quinone, dithiol, and aluminum-dimonum.

* * * * *